United States Patent Office 3,462,534
Patented Aug. 19, 1969

3,462,534
PRODUCTION OF AN ANTIDEPRESSANT EFFECT WITH ESTERS OF GALLIC ACID
Paul Greengard, New York, and Barbara Petrack, Briarcliff Manor, N.Y., assignors to Geigy Chemical Corporation, Ardsley, N.Y., a corporation of New York
No Drawing. Filed June 6, 1967, Ser. No. 643,836
Int. Cl. A61k 27/00
U.S. Cl. 424—308                                                    4 Claims

ABSTRACT OF THE DISCLOSURE

Method for alleviating depression and anti-depressant agents containing as active compound a gallic acid ester. An illustrative embodiment of the active compoud is butyl gallate.

BACKGROUND OF THE INVENTION

Field of the invention

The present invention relates to a method for treating psychosis, particularly depression in warm-blooded animals, and to compositions useful for this purpose. The compositions comprise a compound of the formula

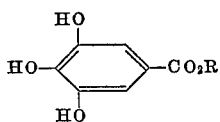

wherein R is lower alkyl or acetyl methyl and a pharmaceutical carrier.

Description of the prior art

The syntheses of gallic esters have been described in the literature by several authors; e.g. by W. Will, Ber. 21, 2022 (1888); H. Meyer, Monatsh., 19, 594; Chem. Fabr. "Naarden" Dutch Patent 66,611; A. Russell and W. G. Tebbens, J.A.C.S., 64, 2274–6 (1942); W. G. Christiansen, J.A.C.S., 48, 1361 (1926). Gallic acid esters, especially propylgallate, have found use as food additives because of their anti-oxidant activity [D. L. Bucher, Fishery Market News, 7, 17–19 (1945)] and low toxicity [A. J. Lehman, O. G. Fitzhugh, A. A. Nelson and G. Woodward, Advances in Food Research, 3, 197 (1951); G. J. van Esch, Voeding, 16, 683–6 (1955)]. The fact that methyl and isopropyl-gallate inhibit the action of the enzyme catechol-o-methyl transferase (COMT) has been described by S. B. Ross and O. Haljasmaa, Acta pharmacol. et toxicol., 21, 205–14 (1964). M. R. R. Rao and H. H. Siddiqui, Indian J. Exptl. Biol., 2, 29 (1964) showed that ethylgallate (phyllemblin) markedly depressed the motor activity of mice and rats, potentiated the action of adrenalin on the blood pressure of cats, on the isolated frog heart, on the nictitating membrane of cats and prolonged the hypnosis induced by Nembutal. None of the references teaches or suggests that the compounds have anti-depressant activity.

DETAILED DESCRIPTION OF THE INVENTION

The advantages of the present invention are attained by providing new compositions exhibiting pharmacologically valuable properties in warm-blooded animals, especially mammals. The new compositions contain as active ingredient a compound of the formula

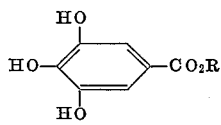

wherein R is lower alkyl or acetyl methyl.

By the term "lower alkyl" is intended a group comprising a straight or branched hydrocarbon chain containing from 1 to about 9 carbon atoms. Illustrative of such alkyl groups are methyl, ethyl, propyl, isopropyl, butyl, isobutyl, pentyl, hexyl, heptyl, octyl, nonyl, etc. Preferred alkyl groups are butyl, pentyl, hexyl, and heptyl.

The instant compositions have a remarkably low toxicity; they are odorless. The compounds of the instant invention can be obtained by simple processes.

The instant compositions can be used to produce a psychotherapeutic, particularly anti-depressant, effect in mammals suffering from mental disorders especially anxiety, tension and depression and in any combination.

Accordingly they may find use for the treatment of mental disorders like agitated or anxious depression, endogenous depression, manic depressive disease, reactive depression, senile depression as well as depressions associated with other pychiatric disorders.

The anti-depressant activity of the compounds of the invention is demonstrated by their true potentiation of L-β-(3,4-dihydroxyphenyl)-alanine (hereinafter referred to as DOPA) in the presence of a monoamine oxidase inhibitor, more specifically in the presence of pargyline.

The well-known anti-depressant drug Imipramine, whose pharmacological activity is not due to monoamine oxidase inhibition and which does not cause an increase in motor activity by itself, potentiates the effects of DOPA under the above-mentioned conditions. In this particular test for anti-depressant activity the compounds of the invention behave very much like or even better than Imipramine.

This test is performed as follows: Male mice ($CF_1$) were injected intraperitoneally with DOPA and Pargyline and the motor activity, as measured electronically in motor activity cages, recorded as control counts (100%). The test compounds were administered, 1 hour prior to the session either intraperitoneally or orally, immediately after the DOPA and Pargyline injections. All injections were made in volumes of 0.1 ml. per 10 g. of body weight of the test animals. One hour after the last administration, the animals were transferred into the motor activity cages. The motor activity was determined over the next hour and the data recorded as percent of control counts.

Table I summarizes the results of the tests.

TABLE I

| | Treatment | Route | No. of animals | Butyl-gallate | Pentyl-gallate | Gallacetol |
|---|---|---|---|---|---|---|
| 1 | Control, 25 mg./kg. DOPA. 200 mg./kg. Pargyline | I.P. I.P. | 18 | 100 | 100 | 100 |
| 2 | 25 mg./kg. DOPA 200 mg./kg. Pargyline 20 mg./kg. test drug | I.P. I.P. I.P. | 18 | 190 | 155 | 120 |
| 3 | 25 mg./kg. DOPA 200 mg./kg. Pargyline 40 mg./kg. test drug | I.P. I.P. I.P. | 18 | 260 | 205 | 161 |
| 4 | 25 mg./kg. DOPA 200 mg./kg. Pargyline 80 mg./kg. test drug | I.P. I.P. I.P. | 18 | 210 | | |
| 5 | 25 mg./kg. DOPA 200 mg./kg. Pargyline 40 mg./kg. test drug | I.P. I.P. P.O. | 18 | 150 | | |
| 6 | 25 mg./kg. DOPA 200 mg./kg. Pargyline 80 mg./kg. test drug | I.P. I.P. P.O. | 18 | 350 | | |
| 7 | 25 mg./kg. DOPA 200 mg./kg. Pargyline 160 mg./kg. test drug | I.P. I.P. P.O. | 18 | 180 | | |
| 8 | 25 mg./kg. DOPA 200 mg./kg. Pargyline 10 mg./kg. Imipramine | I.P. I.P. I.P. | 36 | 135 | | |

The biological mechanism of the anti-depressant activity of the active ingredients of the instant invention is shown by their inhibition of brain catechol-o-methyl transferase (hereinafter referred to as COMT).

The active ingredients of the present invention were tested in mice for in vivo inhibition of COMT. Animals were injected with 200 mg./kg. of the test compounds and sacrificed 1 hour later. The brains were used as an enzyme source for COMT. The assay system measured the conversion of norepinephrine to normetanephrine-O-methyl-$^{14}$C. S.adenosylmethionine-methyl-$^{14}$C was the methyl-$^{14}$C donor. The brain tissue was diluted with phosphate buffer of pH 7.2 by a factor of 6 during the procedure.

The results are shown in the following Table II.

TABLE II

| Test compounds | Number of animals | COMT activity, percent of control |
|---|---|---|
| Butylgallate | 5 | 24 |
| Pentylgallate | 5 | 18 |
| Gallacetol | 10 | 79 |
| Heptylgallate | 5 | 68 |
| Pyrogallol | 5 | 68 |

Butylgallate was chosen for further in vivo tests as a COMT inhibitor at various doses. A still substantial decrease in COMT activity (approximately 50% at ½ hour and 1 hour) was seen at 80 mg./kg. in a similar experiment. The onset of the activity occurred in less than 30 minutes and the duration was greater than 4 hours.

By the administration of the active compounds in dosages from about 2 to about 100 mg./kg. of body weight per day, more particularly from about 2 to about 50 mg./kg. per day, and preferably about 5 mg./kg. to about 15 mg./kg per day, effective anti-depressant activity is observed, although as with any agent of this type, the dose will vary depending on the mammal and condition.

Depending on the nature of the specific condition, the presently claimed compositions may be used in conjunction with the administration of other therapeutic agents. Thus, for example, the compounds described herein may be combined with aspirin, caffein, phenacetin, amphetamine or other anti-depressant agents like, for instance imipramine.

While the compounds of the above-indicated formula may be administered via any of the usual routes, e.g. the oral, parenteral, topical, rectal routes or the like, the preferred one is the oral route.

For such administration, the incorporation of a pharmaceutical carrier for the formation of a pharmaceutical composition is highly desirable. Such compositions used to effect anti-depressant activity comprise a pharmaceutically acceptable carrier and a compound of the general formula which are administered according to the method described above in dosage unit forms acceptable for internal administration.

Such suitable compositions include, without limitation, tablets, capsules, powders, solutions, suspensions, sustained release formulations and the like.

To produce dosage units for peroral application, the compositions of this invention may be combined, e.g. with solid pharmaceutically acceptable pulverulent carriers such as lactose, saccharose, sorbitol, mannitol; starches such as potato starch, corn starch or amylopectin, also laminaria powder or citrus pulp powder, cellulose derivatives or gelatin, also lubricants such as polyethylene glycols (Carbowaxes) of suitable molecular weights may be added, to press tablets or form coated tablets. The latter are coated for example, with concentrated sugar solutions which can contain e.g. gum arabic, talcum and/or titanium dioxide, or they are coated with lacquer dissolved in easily volatile organic solvents. Dyestuffs can be added to these coatings, for example, to distinguish between different contents of active substance.

Hard gelatin capsules contain, for example, granulates of the instant composition with solid pulverulent carriers such as e.g. lactose, saccharose, sorbitol, mannitol and further starches such as potato starch, corn starch or amylopectin, cellulose derivatives or gelatin, as well as stearic acid.

Suppositories containing a compound of the present invention are readily obtained by techniques well known to those skilled in the art of compounding dosage forms. A compound of the present invention is dispersed in a carrier such as cocoa butter and the suppositories formed in the usual way.

The following examples are given by way of illustrating the process for the preparation of the compounds and the compositions without limting the scope thereof in any way.

Example I.—Manufacture of tablets 10 g. of butyl gallate, 5.0 g. of highly dispersed silicic acid and 89.1 g. of corn starch are well mixed and the mixture is uniformly moistened with a solution of 5.0 g. of gelatin, 2.0 g. of glycerin and 0.9 g. of sodium metabisulfite in 100 ml. of demineralized water. The resulting mass is granulated through a sieve and dried to a neater content of 1.0 to 2.1% (absolute). The dry granulate is mixed with 8.0 g. of potato starch, 1.0 g. of highly dispersed silicic acid, 8.0 g. of talcum, and 1.0 g. of magnesium stearate and the mixture is pressed into 1000 tablets each containing 10 mg. of butyl gallate. In the same, tablets are prepared containing 40 mg. of pentylgallate.

Example 2

A granulate is prepared by uniformly mixing 25 g. of butylgallate with 502.0 g. of potato starch, and then moistening with a solution of 15.0 g. of gelatin and 10.0 g. of glycerin in approximately 100 ml. of demineralized water. This is followed by granulating and drying. This granulate is mixed with 20.0 g. of talcum, 20.0 g. potato starch, 5.0 g. of highly dispersed silicic acid and 3.0 g. of magnesium stearate. In this way 1000 press coated tablets each 25 mg. of butylgallate are produced.

In a similar manner press coated tablets are prepared containing 25 mg. of pentylgallate or gallacetol.

Example 3.—Manufacture of capsules

Ingredient:      Quantity/capsule (mg.)
Butylgallate _____ 25
Corn starch, U.S.P. _____ 275

The ingredients are mixed and introduced into a two-piece hard gelatin No. 1 capsule. One each capsule is administered from two to four times daily to patients suffering form depression.

Example 4.—Manufacture of hard gelatin capsules 140 g. of heptylgallate are intimately mixed with 135 g. of corn starch. The mixture is then moistened with 65 ml. of a solution consisting of equal parts of demineralized water and ethanol. The moist mixture is granulated and dried. 10 g. of corn starch and 15 g. of talcum, are then admixed and 1000 hard gelatin capsules are filled each with 300 mg. of this final granuate. Each capsule thus contains 140 mg. of heptylgallate.

In the same manner, capsules are prepared containing pentylgallate, butylgallate or gallacetol.

What is claimed is:

1. A method of producing an anti-depressant effect which comprises internally administering to a mammal suffering from depression a therapeutic amount of a compound of the formula

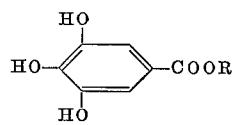

wherein R is lower alkyl or acetylmethyl.

2. A method in accordance with claim 1 in which the compound administered is butylgallate.
3. A method in accordance with claim 1 in which the compound administered is pentylgallate.
4. A method in accordance with claim 1 in which the compound administered is gallacetol.

References Cited

Chem. Abst. (I), 49, p. 11633h (1955).
Chem. Abst. (II), 56, p. 11,970th (1963).
Chem. Abst. (III), 64, p. 1061a (1966).

ALBERT T. MEYERS, Primary Examiner
S. J. FRIEDMAN, Assistant Examiner